(12) United States Patent
Varadarajan et al.

(10) Patent No.: US 11,430,136 B2
(45) Date of Patent: Aug. 30, 2022

(54) METHODS AND APPARATUS TO IMPROVE EFFICIENCY OF OBJECT TRACKING IN VIDEO FRAMES

(71) Applicant: Intel Corporation, Santa Clara, CA (US)

(72) Inventors: Srenivas Varadarajan, Bangalore (IN); Girish Srinivasa Murthy, Bangalore (IN); Anand Bodas, Bangalore (IN); Omesh Tickoo, Portland, OR (US); Vallabhajosyula Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 16/721,504

(22) Filed: Dec. 19, 2019

(65) Prior Publication Data

US 2020/0134837 A1 Apr. 30, 2020

(51) Int. Cl.
*G06T 7/215* (2017.01)
*G06K 9/62* (2022.01)
*G06V 20/40* (2022.01)

(52) U.S. Cl.
CPC ............ *G06T 7/215* (2017.01); *G06K 9/6269* (2013.01); *G06V 20/41* (2022.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 7,203,338 B2 | 4/2007 | Ramaswamy et al. | |
| 7,466,844 B2 | 12/2008 | Ramaswamy et al. | |
| 7,609,853 B2 | 10/2009 | Ramaswamy et al. | |
| 8,194,923 B2 | 6/2012 | Ramaswamy et al. | |
| 8,660,308 B2 | 2/2014 | Ramaswamy et al. | |
| 8,824,740 B2 | 9/2014 | Ramaswamy et al. | |
| 2010/0124274 A1* | 5/2010 | Cheok ................. | H04N 19/152 375/240.03 |
| 2013/0229518 A1* | 9/2013 | Reed ................... | H05B 47/125 348/148 |
| 2018/0285634 A1* | 10/2018 | Varadarajan ......... | G06K 9/6274 |
| 2020/0364885 A1* | 11/2020 | Latapie ................. | G06T 7/11 |
| 2021/0133483 A1* | 5/2021 | Prabhu ................ | G06K 9/6202 |

* cited by examiner

*Primary Examiner* — Vikkram Bali
(74) *Attorney, Agent, or Firm* — Hanley, Flight & Zimmerman, LLC

(57) ABSTRACT

Methods, apparatus, systems and articles of manufacture to improve efficiency of object tracking in video frames are disclosed. An example apparatus includes a clusterer to cluster a map of a video frame into blobs; a comparator to determine an intersection over union value between the blobs and bounding boxes in a second video frame; and an interface to initiate object detection by a neural network on the first video frame when the intersection over union does not satisfy a threshold.

25 Claims, 6 Drawing Sheets

METHODS AND APPARATUS TO IMPROVE EFFICIENCY OF OBJECT TRACKING IN VIDEO FRAMES

FIELD OF THE DISCLOSURE

This disclosure relates generally to video processing, and, more particularly, to methods and apparatus to improve efficiency of object tracking in video frames.

BACKGROUND

Video processing systems often implement computer vision and/or image processing to analyze video. In some video processing systems, object detection is performed on digital video to detect instances of objects in the video corresponding to different classes (e.g., animals, vehicles, people, props, etc.). Object detection can be used to track an object throughout a video stream (e.g., a ball in a sporting event, a person or animal as it moves across the ground, etc.). Object detection tracks objects from frame to frame to determine whether the object is moving.

Figure 1:
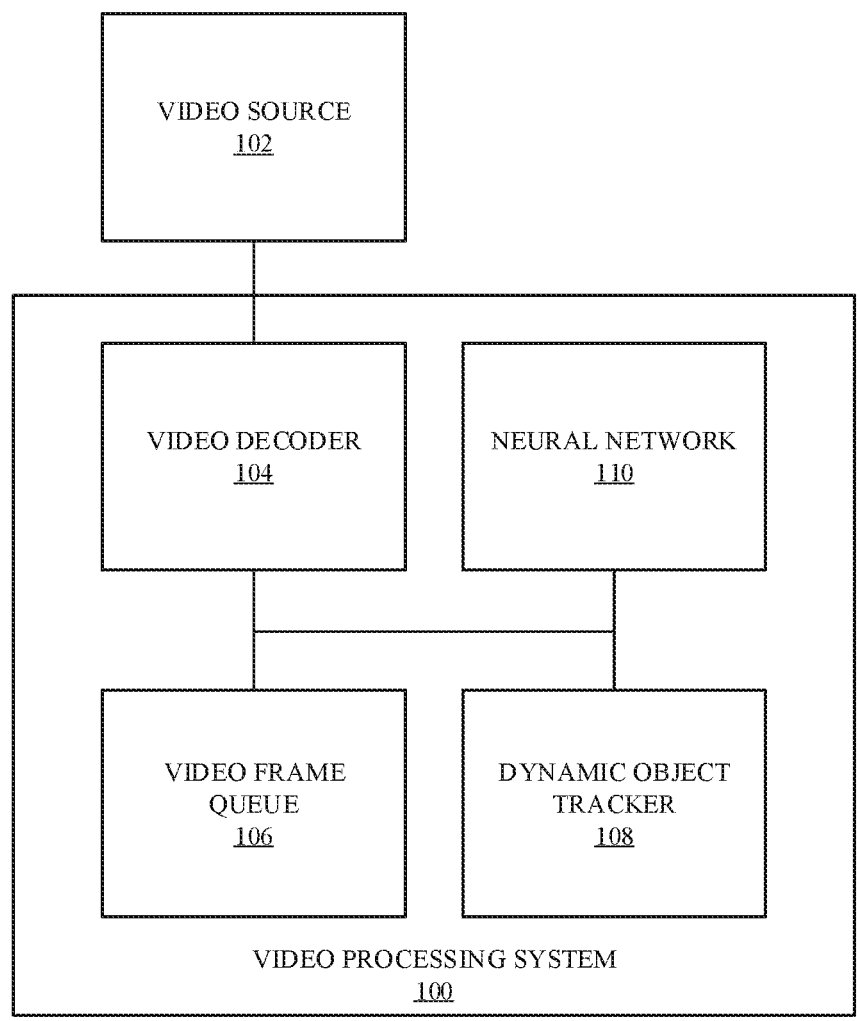
FIG. 1 illustrates an example video processing system to perform object tracking in accordance with the examples of this disclosure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, advances in technology have led to advances in video processing. The advancement of artificial intelligence (AI) (e.g., neural networks, machine learning (ML), deep learning, etc.) has improved the ability of video processing devices to track the movement of objects in a video stream. A known video processing system that uses AI to track objects passes frames of a video into the AI system. The AI system generates bounding boxes that correspond to (e.g., surround) detected objects in a frame. A bounding box is a region in a frame (e.g., a rectangular region) that corresponds to (e.g., surrounds) an object of interest (e.g., a foreground object and/or a moving object) that may be represented as a coordinate, vector, etc. As each frame is processed by the AI system, the bounding boxes can be tracked from frame to frame to track the movement of objects of interest in the video stream. AI-based object detection includes utilizing AI to identify object (e.g., by generating bounding box(es) for object(s)) in a frame. Object tracking includes tracking the detected objects (e.g., bounding box(es)) from a frame that underwent AI-based object detection to a subsequent frame that (a) underwent AI-based object detection or (b) underwent non AI-based object detection. As used herein, non-AI based object detection is any sort of object detection that does not employ artificial intelligence.

Although using known AI-based object detection for a frame is very accurate and can be class or type specific (e.g., can be tuned to detect different classes or type of objects, such as buildings, humans, cars, etc.), known AI-based object detection is computationally intensive (e.g., requires a large amount of computer resources to execute) and slow. Although object tracking (e.g., comparing bounding boxes from a previous frame with bounding boxes of a current frame) is coarse and not class-specific, object tracking is fast and uses a small amount of computing resources. Accordingly, some known video processing systems only perform object detection after every X number of frames and perform object tracking after each object detection (e.g., by determining a new location of objects that were detected in previous frames). In this manner, instead of performing object detection for every frame, resources are conserved by performing object detection once every X frames that undergo object tracking. However, if a new object enters a frame between object detection frames, the new object will go unnoticed until the subsequent object detection occurs, corresponding to poor performance. As used herein, an object detection period or an object detection period count corresponds to the number of frames processed between AI-based object detection operation.

Examples disclosed herein include a protocol that is performed on frames between object detection periods (e.g., between frames that are flagged for object detection analysis using the AI system). This protocol enables identification of frames when a new object is present in a frame without the use of the computationally intensive AI based object detection. To identify new objects in a frame, examples disclosed herein cluster macroblocks of a frame into blobs. The blobs correspond to objects of interest (e.g., foreground objects in a frame), Examples disclosed herein determine that a new object is present in a frame when the number of blobs (e.g., with a size is above a preset threshold to avoid insignificant foreground objects) is above the number of bounding box (es) from a previous AI-object detected frame. If examples disclosed herein determine that a new object has entered a sequence of frames, then the video processing system can initiate the AI-based object detection for the current frame regardless of when the next object detection period is to begin (e.g., regardless of when the next AI object detection analysis is scheduled). This off period initiation of AI-based object detection analysis can be thought of as an interrupt. In this manner, tracking performance is increased by initiating AI-based object detection whenever necessary (e.g., when a new object appears in a sequence of frames).

Additionally, because known video processing techniques perform object detection at a fixed period of time (e.g., after a preset number of video frames (e.g., X frames)), such known video processing techniques can overutilize and/or underutilize object detection, depending on the content of the video. For example, for video streams that include action scenes where lots of objects are entering and exiting one or more of a sequence of frames, the object detection period (e.g., duration between AI-based object detection should be low so that the object tracking performance is high. However, for video streams where there are no objects entering and/or exiting the frame sequence for long durations of time, the object detection period can be higher to conserve resources. Accordingly, the preset object detection period of such known techniques is inefficient as the object detection period is not adaptive to the characteristics of the video.

Examples disclosed herein generate a variable object detection period that adjusts based on the tracking performance. Examples disclosed herein evaluate the tracking performance after the AI-based object detection protocol is performed on a frame by comparing the bounding box(es) of the current frame to bounding box(es) of a previously AI-processed frame. If the tracking performance is good (e.g., no change in the number of bounding box(es)), examples disclosed herein increase the object detection period, thereby conserving computing resources and speeding up the video processing process. If the tracking performance is not good (e.g., changes in the number of bounding box(es)), examples disclosed herein decrease the object detection period (e.g., or reset to a base value), thereby increasing the tracking performance for subsequent frames.

FIG. 1 illustrates an example video processing system 100 that processes a sequence of stream of video frames from an example video source 102. The example video processing system 100 includes an example video decoder 104, and example video frame queue 106, an example dynamic object tracker 108, and an example neural network 110. The example video processing system 100 may be implemented in a processing device, a server (e.g., an INTEL XEON'— based server), and/or any other computing device located in any location (e.g., in the cloud, locally in a device, etc.)

The example video source 102 of FIG. 1 provides video (e.g., video streams) to the example video processing system 100 for object tracking. For example, the video source 102 may be a data center (e.g., FACEBOOK™, ALMABA™, NETFLIX™, AMAZON.COM™, ADT™, YOUTUBE™, etc.) that provides video streams (e.g., directly or via a wireless network communication) to the example video processing system 100. Additionally or alternatively, the example video source 102 may be a camera, a set top box, a television, a digital video recorder, a video gaming system, and/or any other device that is capable of providing video streams.

The example video decoder 104 of FIG. 1 obtains video (e.g., video streams) from the example video source 102 (e.g., via a wired or wireless connection) and decodes the video. The video can be transported, encoded and decoded using any desired standard (e.g., HTTP live streaming (HLS), MPEG-DASH, RTMP, HTML5, etc.). The video decoder may include receiver circuitry to convert base-band analog video signals into digital video frames. In some examples, if the video is already in digital form, the example video decoder 104 separates the digital video into frames. The example video decoder 104 stores the decoded video frames in the example video frame queue 106. The example video frame queue 106 is a storage device (e.g., cache, local memory, a buffer, etc.) that stores the decoded video frames.

The example dynamic object tracker 108 of FIG. 1 performs object detection (e.g., using the neural network 110 to process a video frame) and/or object tracking (comparing regions of interest (e.g., bounding box(es) and/or blobs) of a frame to bounding box(es) of a previous frame). As described above, object detection using the neural network 110 is very accurate, class specific, slower, and more computationally intensive, whereas a compressed domain object tracking approach (e.g., object detection without the use of the neural network 110) is coarse, not class specific, faster, and less computationally intensive. Accordingly, the example dynamic object tracker 108 adjusts the object detection period by determining an object tracking quality and performs an interrupt to initiate object detection when a new object is detected. For example, the dynamic object tracker 108 facilitates an AI-based object detection for a first frame followed by a number of frames that are not processed with AI-based object detection followed by an AI-based object detection for a second frame and the process is repeated. In this manner, resources are conserved and the process is sped up by not performing AI-based object detection on every frame. In such an example, the dynamic object tracker 108 performs object tracking by comparing bounding box(es) resulting from object detection to blob(s) identified in the current frame. For example, the dynamic object tracker 108 may information present in the video bitstream (e.g., motion vectors) for the current frame to determine the new location of the bounding boxes based on their location in the previous frame. After AI-based object detection of a frame, the dynamic object tracker 108 may determine an object tracking quality metric for selected frames and adjust the object detection period (e.g., corresponding to the number of frames between frames on which AI-based object detection is to be performed) based on the object tracking quality metric. The object tracking quality metric estimates tracking quality based on a comparison (e.g., an intersection over union ratio, as further described below) of (a) objects previously detected objects in previous frames by the neural network 110 and tracked in the subsequent frames with the object tracker to (2) objects detected by the neural network 110 in the currently processed frame. If the object tracking quality metric is above or equal to a threshold (e.g., corresponding to good tracking performance), the object detection period is increased (e.g., to conserve resources and increase speed) and if the object tracking quality metric is below the threshold (e.g., corresponding to poor tracking performance), the object detection period is decreased or reset to a base value (e.g., to improve tracking performance). For example, the based value of the object detection period may correspond to 15 frames, corresponding to 0.25 seconds for a 60 frames-per-second video stream. In such an example, if the object quality metric is 0.7 and the threshold is 0.5, then the object detection period may be incremented by a value of 5 frames, corresponding to 0.083 seconds for a 60 frames-per-second video stream. In this manner, the object detection period is increased to 20 frames or 0.33 seconds. However, the threshold, the base value, and/or the increment amount may be adjusted to any value. In some examples, if the object tracking quality metric is equal to (or within a threshold range of) the threshold, the object detection period is maintained (e.g., not increased or decreased).

Additionally or alternatively, the example dynamic object tracker 108 of FIG. 1 may trigger AI-based object detection based on a determination that a new object has appeared in a frame during object tracking without the use of the neural network 110. For example, the dynamic object tracker 108 may generate coarse blob(s) (e.g., cluster(s) of macroblocks of the frame with area over a threshold (e.g., to filter out false positives of insignificant foreground objects) corresponding to objects of interest in the current frame. The example dynamic object tracker 108 compares the blob(s) to the bounding box(es) of the last AI-based object detection to determine if a new object has entered the frame. If the dynamic object tracker 108 determines that a new object has entered into a frame, the dynamic object tracker 108 performs an interrupt of the object detection period to initiate an AI-based object detection protocol using the example neural network 110. To determine whether a new object has entered a frame, the dynamic object tracker 108 may perform an intersection over union between the detected blobs and the AI-based bounding boxes (e.g., bounding boxes from one or more previous frames). The intersection over union is a ratio of (A) the intersection between all the blob(s) of the frame with all the tracked object(s) (e.g., bounding box(es) from a previous AI-based object detection) and (B) the union of all the blob(s) of the frame with all the tracked object(s). If the intersection over union value is below a threshold, the dynamic object tracker 108 determines that there is a new object in the frame. For example, if the threshold is 0.7 and the intersection over union value is below the threshold (e.g., 0.4), the dynamic object tracker 108 determines that there is a new object in the frame. The example dynamic object tracker 108 is further described below in conjunction with FIG. 2.

The example neural network 110 of FIG. 1 is a trained neural network (e.g., a convolution neural network) that receives video frames and performs AI-based object detection by generating bounding boxes corresponding to objects of interest in the video frames. Additionally or alternatively, the neural network 110 may be implemented by any type of AI system, such as a machine learning model, a deep learning model, and/or any other type of model and/or network. A bounding box is used to describe the position of a target object in a frame. Accordingly, the trained neural network 110 obtains a video frame, identifies target objects and generates bounding boxes for the target objects. The bounding box corresponds to regions of interest (e.g., foreground objects) of a particular object in a video frame. In some examples, a video frame may need to be decompressed and reconstructed prior to being input by the trained neural network. In such examples, an additional component of the example video processing system 100 may decompress and/or reconstruct the video frame prior to being input into the example neural network 110.

Figure 2:
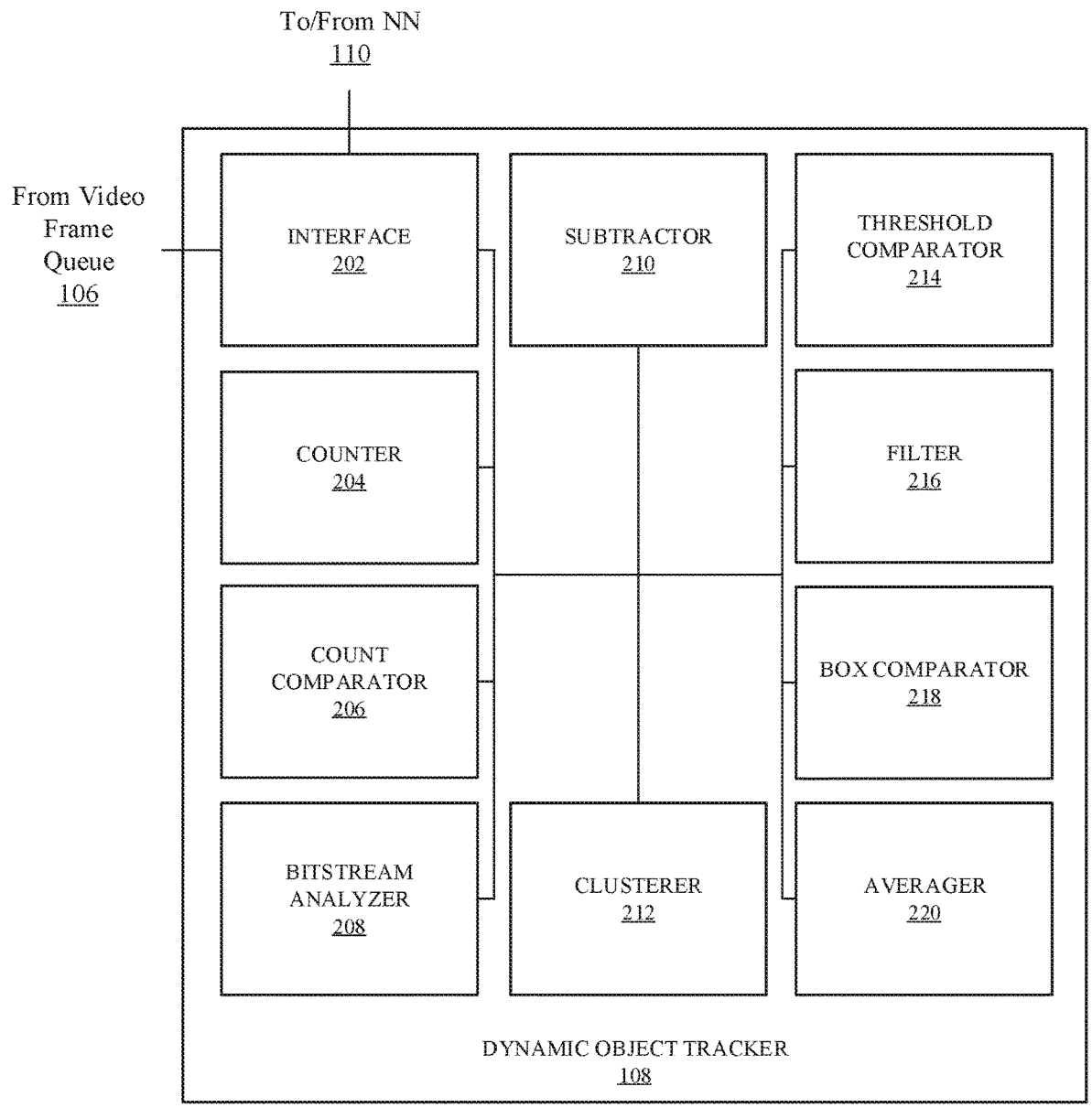
FIG. 2 is a block diagram of an example implementation of the dynamic object tracker of FIG. 1

FIG. 2 is block diagram of an example implementation of the dynamic object tracker 108 of FIG. 1. The example dynamic object tracker 108 includes an example interface 202, an example counter 204, an example count comparator 206, an example bitstream analyzer 208, an example subtractor 210, an example clusterer 212, an example threshold comparator 214, an example filter 216, an example box comparator 218, and an example averager 220.

The example interface 202 of FIG. 2 accesses video frame(s) from the example video frame queue 106 of FIG. 1. The example interface 202 accesses one video frame at a time to compare (e.g., determine new positions of) the detected objects from previous frames with detected objects and/or blob(s) in a current frame. Additionally, the example interface 202 transmits video frame(s) to the example neural network 110 to initiate AI-based object detection in the pixel domain. Once the example neural network 110 performs the object detection operation to obtain bounding boxes in the current frame, the interface 202 obtains the results (e.g., the determined bounding box(es)) from the neural network 110. The interface 202 may store the results in memory (e.g., cache, local memory, a buffer, etc.) for use in comparison with (e.g., tracking the new position in) a subsequent video frame. The example interface 202 may be implemented as a single interface (e.g., to interface with the video frame queue 106 and the neural network 110) or as multiple interfaces (e.g., a first interface to interface with the video frame queue 106 and a second interface to interface with the neural network 110).

The example counter 204 of FIG. 2 tracks the frame count corresponding to when AI-based object detection using the example neural network 110 is to be performed. For example, the counter 204 initiates the frame count to zero or one and increments the frame count for every video frame that is processed and/or obtained. Once the frame count is equal to or greater than an object detection period (e.g., a value corresponding to the number of frames that can be processed without the neural network 110 before AI-based object detection is to be performed with the neural network 110), the counter 204 resets the frame count. Additionally, when the example dynamic object tracker 108 determines that a new object has been detected (e.g., entered a frame), the counter 204 resets the frame count.

Additionally, the example counter 204 of FIG. 2 manages the object detection period count. As further described below, the object detection period count may be increased (e.g., incremented) or decreased (e.g., decremented, reset to a base value, etc.) based on a determined object training quality metric. In some examples, if the object training quality metric is above a threshold, the example counter 204 increments the object detection period count by some amount (e.g., 5 frames) and if the object training quality metric is below the threshold, the example counter 204 decrements the object detection count by some amount (e.g., 3 frames) or resets the object detection period count to a base value. By increasing the object detection count, the duration of time before the next AI-based object detection period increases to thereby decrease the frames at which the neural network 110 is used for object detection, thereby conserving resources and increasing processing speed. By decreasing the object detection count, the duration of time before the next AI-based object detection period decreases to increase the frequency at which the neural network 110 is invoked for object detection, thereby increasing tracking performance by increasing the use of the neural network 110. The example counter 204 may be implemented as a single counter (e.g., to track both the frame count and the object detection count) or as multiple counters (e.g., a first counter to track the frame count and a second counter to track the object detection count).

The example count comparator 206 of FIG. 2 compares the frame count of the counter 204 to the object detection period count. If the example count comparator 206 determines that the frame count is below the object detection count, the count comparator 206 determines that AI-based object detection using the neural network 110 is not to be invoked. If the example count comparator 206 determines that the frame count is greater than or equal to the object detection count, the count comparator 206 determines that AI-based object detection using the neural network 110 is to be performed and the example interface 202 is instructed to transmit (e.g., by changing a position of a controlled switch) the current video frame to the example neural network 110 to perform AI-based object detection.

The example bitstream analyzer 208 of FIG. 2 analyzes a bitstream of the frame and/or video stream to identify information embedded in the bitstream. For example, the bitstream analyzer 208 may process the bitstream to identify the global motion vector of the frame. The global motion vector is a vector corresponding to the motion of the camera in a video. To detect and/or track objects in a frame, the movement of the camera is eliminated from the frame, otherwise every object appears to be moving when compared with a previous frame. Accordingly, the bitstream analyzer 208 identifies the global motion frame by processing the bitstream of the video stream and/or frame. The bitstream analyzer 208 forwards the global motion vector to the subtractor 210.

The example subtractor 210 of FIG. 2 subtracts the global motion vector (e.g., from the bitstream analyzer 208) from the current frame. As described above, the global motion vector corresponds to the movement of the camera when generating the video stream. The result of the difference is a foreground motion map including macroblocks with significant motion vectors. If the camera is not moving, then the global motion vector will be zero and the subtractor 210 can forgo the subtraction. The subtractor 210 forwards the foreground motion map to the example clusterer 212.

The example clusterer 212 of FIG. 2 clusters (e.g., groups) pixels of the foreground motion map into blobs (e.g., rectangular blobs). For example, the clusterer 212 may use a region growing algorithm, a growing cell algorithm, and/or any other kind of data clustering algorithm to cluster the foreground motion into blobs. The clusterer 212 segments the frame by grouping neighboring pixels that do not include detected edges in the neighborhood of pixels. The clusterer 212 forwards the blobs to the example threshold comparator 214.

The example threshold comparator 214 of FIG. 2 compares one or more values to one or more thresholds. For example, when the threshold comparator 214 receives the blobs corresponding to the currently processed video frame, the threshold comparator 214 determines if there are one or more blobs that are below a threshold size (e.g., if the number of pixels in a blob is below a threshold number of pixels). In this manner, the example filter 216 can filter out (e.g., discard) blobs that are insignificant in size (e.g., because they are smaller than a threshold size), thereby retaining blobs that are more than the threshold size. The threshold size may be based on characteristics (e.g., resolution, viewpoint, scale, field of view, amount of zoom, etc.) of the video frame. For example, a frame with a smaller field of view may have a larger threshold, while a frame with a larger field of view may have a smaller threshold. The example bitstream analyzer 208 may determine the characteristics (e.g., resolution, viewpoint, scale, field of view, amount of zoom, etc.) from the bitstream of the video stream and/or frame. For example, frame information (e.g., frame width and/or frame height) can be obtained from sequence and/or picture parameters of the bitstream of the video. In some examples, field of view and/or amount of zoom could be taken from supplemental enhancement information (SEI) messages in the bitstream.

Additionally, after the box comparator 218 determines an intersection over union value (as further described below), the threshold comparator 214 of FIG. 2 may compare the intersection over union value to a threshold. The box comparator 218 determines the intersection over union as a ratio of (A) the intersection between all the blob(s) of the frame with all the tracked object(s) (e.g., bounding box(es) from a previous AI-based object detection) and (B) the union of all the blob(s) of the frame with all the tracked object(s). In this manner, the box comparator 218 can determine whether or not there is a new object in the fame based on whether or not the intersection over union value is above or below the threshold, as further described below.

Additionally, after one or more object training quality metrics has/have been determined (as further described below), the example threshold comparator 214 of FIG. 2 compares the object training quality metric(s) to a threshold. In some examples, the object training quality metrics corresponds to intersection over union values between paired bounding boxes. In such examples, the threshold comparator 214 may increment the object detection period count when all, or most, of the object training quality metrics are greater than or equal to the threshold and decrement and/or reset the object detection period count when one or more of the object training quality metrics are less than the threshold. In some examples, the object training quality metric is an average of the intersection over union values between the paired bounding boxes. In such examples, the threshold comparator 214 may increment the object detection period count when the object training quality metric (e.g., the average intersection over union) is greater than or equal to the threshold and decrement and/or reset the object detection period count when the object training quality metric is less than the threshold. In this manner, the example counter 204 can increment, decrement, and/or reset the object detection period count based on the result of a comparison of the object training quality metric to the threshold, as described above. The example threshold comparator 214 may be implemented as a single comparator (e.g., to perform the above threshold comparisons) or as multiple comparators (e.g., a first threshold comparator to compare blob size to a first threshold, a second threshold comparator to compare the intersection over union value to a second threshold, etc.).

The example box comparator 218 of FIG. 2 identifies when a frame has a new object (e.g., an object that were not identified in a previous frame) using an object detection approach in the compressed domain as opposed to using the example neural network 110 (e.g., after the frame is decompressed and reconstructed). For example, the box comparator 218 may compare clustered blobs identified from the foreground motion map (e.g., after the smaller blobs have been filtered out) to tracked objects (e.g., tracked bounding boxes from the AI-based object detection of a previous frame performed by the example neural network 110) using an intersection over union. In such an example, the box comparator 218 determines a ratio of (A) intersection between the clustered blobs and the tracked objects and (B) the union of the clustered blobs and the tracked objects.

Additionally, during object tracking quality metric determination (e.g., after AI-based detection has been performed with the neural network 110 on a frame), the example box comparator 218 of FIG. 2 compares the number of bounding box(es) in a previous frame to the number of bounding box(es) in the current frame. If the number of bounding box(es) of the frame is greater than the bounding box(es) of a previous frame (e.g., object tracking bounding box(es)), the box comparator 218 determines that there is poor tracking performance and the example counter 204 reduces or resets the object detection count. In this manner, AI-based object detection using the neural network 110 will be implemented more often for subsequent frame(s) to increase tracking performance.

Additionally, if the number of bounding box(es) of the current frame is not greater than the number of bounding box(es) in the previous frame, the example box comparator 218 of FIG. 2 pairs the bounding box(es) in a previous frame with the of bounding box(es) in the current frame. For example, the box comparator 218 may compare the tracked bounding boxes with detected bounding boxes using a nearest neighbor measure representing the bounding boxes by a vector of pixel coordinates. Once paired, the example box comparator 218 determines intersection over union value(s) between the paired bounding box(es) of the previous frame and the current frame. In some examples (e.g., when the intersection over union value(s) are not averaged), the intersection over union value(s) correspond to object tracking quality metrics that are passed to the example threshold comparator 214 to determine how to increment, decrement, and/or reset the object detection period value. In some examples (e.g., when the intersection over union value(s) are averaged), the example box comparator 218 passes the intersection over union value(s) between the paired bounding box(es) to the example averager 220. The example box comparator 218 may be implemented as a single comparator (e.g., to perform the above box comparisons) or as multiple comparators (e.g., a first box comparator to compare clustered blobs with tracked bounding boxes, a second box comparator to compare the number of tracked bounding box(es) to the number of detected bounding box (es), etc.).

In some examples (e.g., when the object tracking quality metric is an average of the intersection over unions), the example averager 220 of FIG. 2 determines the object tracking quality metric based on the average intersection over union value between paired bounding boxes. For example, if the example box comparator 218 paired three sets of bounding boxes (e.g., 6 boxes in 3 sets of 2) from a previous frame and the current frame and determined that the intersection over union value for respective pairs are 0.9, 0.85, and 0.7, the averager 200 determines the object tracking quality metric (e.g., the average intersection over union value) to be 0.82 ((0.9+0.85+0.7)/3). As described above, the example threshold comparator 214 compares the object tracking quality metric to a threshold to determine whether to increment, decrement, and/or reset the object detection period. In some examples (e.g., when the object tracking quality metrics are the average intersection over union values for each paired bounding box(es)), the example averager 220 is eliminated and the example threshold comparator 214 determines whether to increment, decrement, and/or reset the object detection period based on whether any one of the object tracking quality metrics is below the threshold.

While an example manner of implementing the example video processing system 100 and/or the example dynamic object tracker 108 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example video decoder 104, the example video frame queue 106, the example neural network 110, the example interface 202, the example counter 204, the example count comparator 206, the example bitstream analyzer 208, the example subtractor 210, the example clusterer 212, the example threshold comparator 214, the example filter 216, the example box comparator 218, the example averager 220, and/or, more generally, the video processing system 110 of FIG. 1 and/or the example dynamic object tracker 108 of FIG. 2 may be implemented by hardware, software, firmware and/or any combination of hardware, software and/or firmware. Thus, for example, any of the example video decoder 104, the example video frame queue 106, the example neural network 110, the example interface 202, the example counter 204, the example count comparator 206, the example bitstream analyzer 208, the example subtractor 210, the example clusterer 212, the example threshold comparator 214, the example filter 216, the example box comparator 218, the example averager 220, and/or, more generally, the video processing system 110 of FIG. 1 and/or the example dynamic object tracker 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example video decoder 104, the example video frame queue 106, the example neural network 110, the example interface 202, the example counter 204, the example count comparator 206, the example bitstream analyzer 208, the example subtractor 210, the example clusterer 212, the example threshold comparator 214, the example filter 216, the example box comparator 218, the example averager 220, and/or, more generally, the video processing system 110 of FIG. 1 and/or the example dynamic object tracker 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example video processing system 100 and/or the example dynamic object tracker 108 of FIG. 1 may include one or more elements, processes and/or devices in addition to, or instead of, those illustrated in FIGS. 1, and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example dynamic object tracker 108 of FIGS. 1 and/or 2 are shown in FIGS. 3-6. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-6 many other methods of implementing the example dynamic object tracker 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
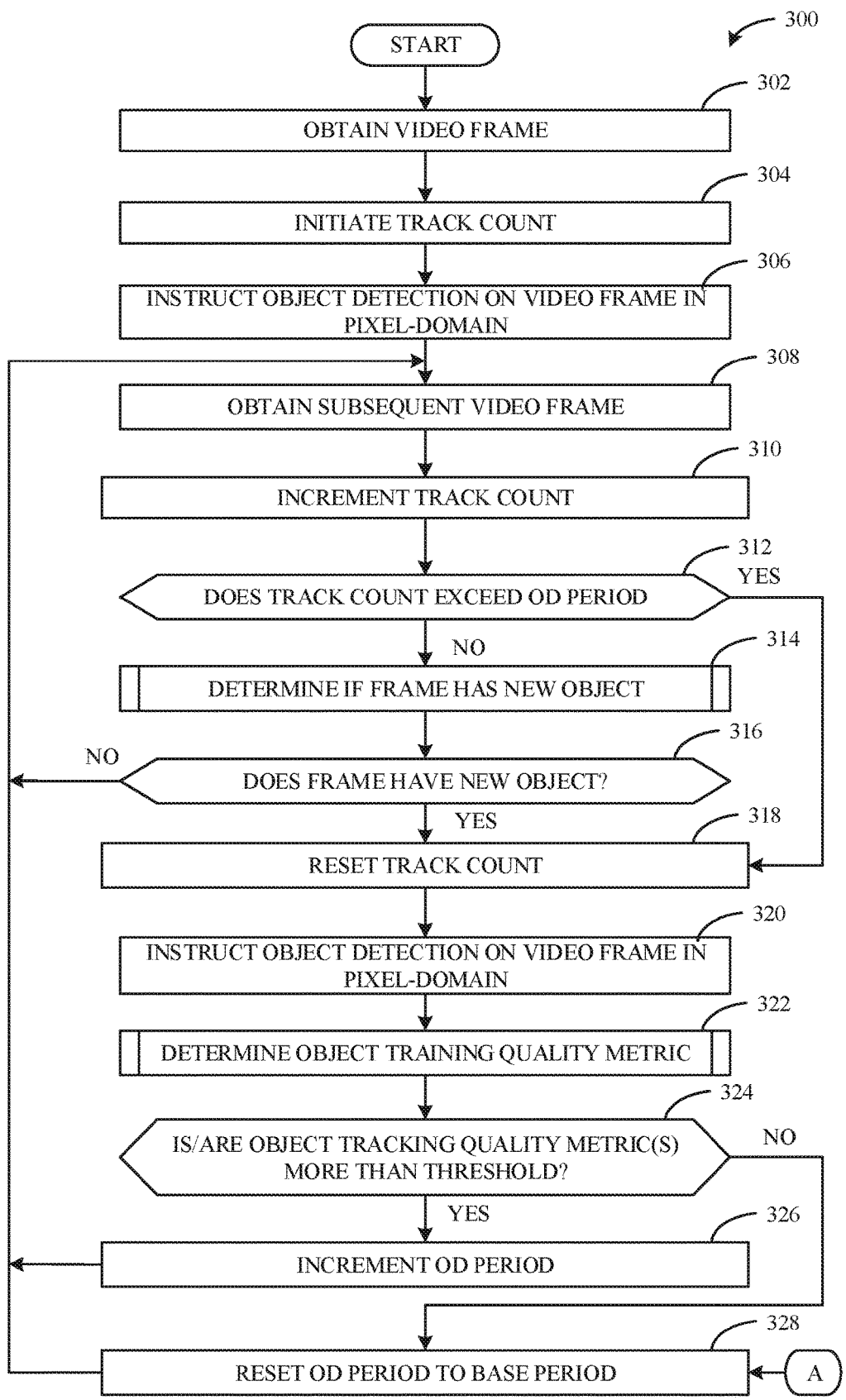
FIGS. 3-5 are flowcharts representative of example machine readable instructions which may be executed to implement the example dynamic object tracker of FIGS. 1 and/or 2 to improve the efficiency of object tracking in video frames.

FIG. 3 is an example flowchart representative of machine readable instructions 300 that may be executed to implement the example dynamic object tracker 108 of FIG. 2 to improve efficiency of object tracking in video frames. Although the instructions 300 are described in conjunction with the example dynamic object tracker 108 of FIG. 2, the instructions 300 may be described in conjunction with any type of video processing system.

At block 302, the example interface (2) 202 obtains a video frame from the example video frame queue 106. As described above in conjunction with FIG. 2, the video frame queue 106 stores ordered digital video frames corresponding to a video stream from the example video source 102 of FIG. 1. At block 304, the example counter 204 initiates the frame count. The frame count is a count that is incremented with each processed video frame. The frame count is used to trigger AI-based object detection using the example neural network 110. For example, if the frame count is 7, the frame count will be initiated to a first number (e.g., 0 or 1) and when the frame count reaches 7 (e.g., after 6 or 7 processed video frames), AI-based object detection using the neural network 110 is initiated.

At block 306, the example interface 202 instructs the example neural network 110 to perform an object detection on the obtained video frame in the pixel-domain. As described above in conjunction with FIG. 1, the neural network 110 processes the frame to generate bounding box(es) corresponding to areas of interest in a video frame. At block 308, the example interface 202 obtains a subsequent video frame from the example video frame queue 106. At block 310, the example counter 204 increments the frame count.

At block 312, the example count comparator 206 determines if the frame count exceeds the object detection (OD) period count. As described above, the object detection period count corresponds to the amount of frames that can be processed without use of the example neural network 110 before the neural network 110 is used to perform AI-based object detection. If the example count comparator 206 determines that the frame count has exceeded the object detection period count (block 312: YES), control continues to block 318, as further described below. If the example count comparator 206 determines that the frame count has not exceeded the object detection period count (block 312: NO), the example dynamic object tracker 108 determines if the obtained video frame has a new object (e.g., an object that was not detected in a previous video frame) (block 314), as further described below in conjunction with FIG. 4.

If the dynamic object tracker 108 determines that the frame does not have a new object (block 316: NO), control returns to block 308. In this manner, because the frame count has not exceeded the object detection period count and a new object has not been identified, the dynamic object tracker 108 can conserve resources by forgoing AI-based object detection using the example neural network 110 without compromising significant tracking performance. If the dynamic object tracker 108 determines that the frame has a new object (block 316: YES), the example counter 204 resets the frame count (e.g., to the initial frame count value of block 304) (block 318). At block 320, the example interface 202 instructs the example neural network 110 to perform an object detection on the obtained video frame in the pixel-domain to identify (e.g., detect) bounding boxes for items of interest in the frame (block 320).

At block 322, the example dynamic object tracker 108 determines the object training quality metric(s), as further described below in conjunction with FIG. 5. The object tracking quality metric(s) correspond(s) to how well the object tracking performance is between AI-based object detections of two frames using the neural network 110. For example, if object tracking is good, regardless of the amount of frames between object detection using the neural network 110, the tracking quality metric(s) will be high and if object tracking is not good, one or more tracking quality metric(s) will be low. As further described above, the object tracking quality metric may be the intersection over unions of paired bounding box(es) or may be an average of the intersection over union of the paired bounding box(es). At block 324, the example threshold comparator 214 determines if the object tracking quality metric(s) is/are more than a threshold. If the object tracking quality metric is an average, the threshold comparator 214 compares the average to the threshold. If the object tracking quality metrics are the intersection over unions of the paired bounding boxes, the threshold comparator 214 compares each of the intersection over unions to the threshold. If one or more of the intersection over unions is below the threshold, the threshold comparator 214 determines that there is poor tracking quality.

If the example threshold comparator 214 determines that the object tracking quality metric(s) is/are more than a threshold amount (e.g., object tracking is good) (e.g., the intersection over union is greater than the threshold or all or most of the individual intersection over unions are above the threshold)) (block 324: YES), the counter 204 increments the object detection period count (block 326) to conserve resources by extending the number of frames that can be processed without the neural network 110. If the example threshold comparator 214 determines that the object tracking quality metric is not more than a threshold amount (object tracking is not good (e.g., the intersection over union is below the threshold or one or more of the individual intersection over unions is below the threshold)) (block 324: NO), the counter 204 resets the object detection period count to the base count (block 328) to increase object detection performance by decreasing the number of frames that can be processed without the neural network 110. Alternatively, the example counter 204 may decrease or decrement the reset OD period to base period in response to the object tracking quality metric is not more than the threshold. After block 326 or block 328, control returns to block 308 to process a subsequent frame.

Figure 4:
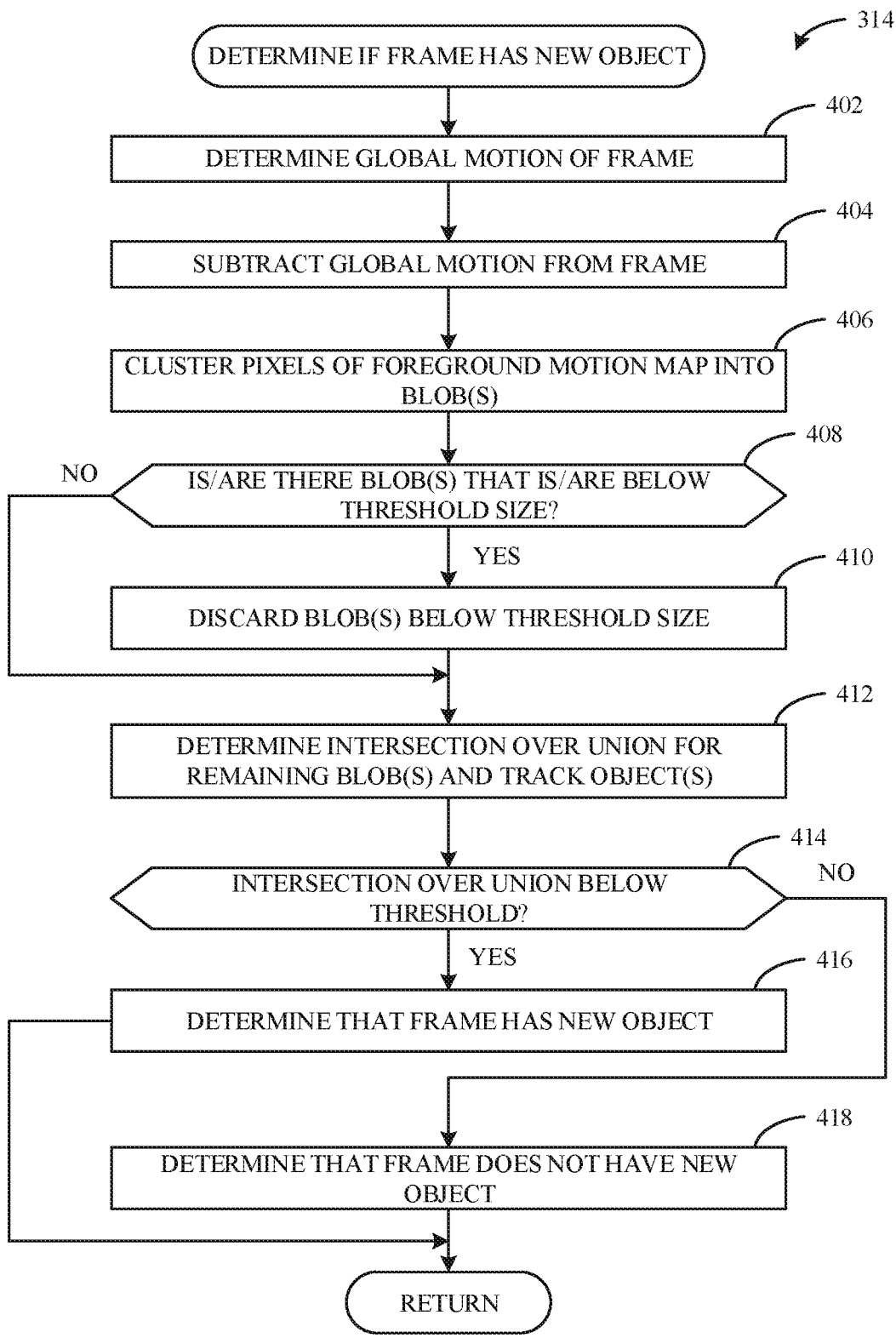

FIG. 4 is an example flowchart representative of machine readable instructions 314 that may be executed to implement the example dynamic object tracker 108 of FIG. 2 to determine if the currently processed frame includes a new object, as described above in conjunction with block 314 of FIG. 3.

At block 402, the example bitstream analyzer 208 determines the global motion of the frame based on the bitstream of the frame and/or the video stream. As described above in conjunction with FIG. 2, the global motion corresponds to the motion of the camera. Because the motion of the camera will correspond to object movement from frame to frame even if the object is motionless, the example dynamic object tracker 108 accounts for the global motion vector so that the motion of the camera does not affect object tracking. At block 404, the example subtractor 210 subtracts the global motion from the current frame, thereby zeroing out the motion of the camera and resulting in a foreground motion map. In some examples, if the global motion is zero, the subtractor 210 may skip the instructions of block 404.

At block 406, the example clusterer 212 clusters the pixels of the foreground motion map (e.g., the result of the global motion frame minus the current frame) into blob(s) (e.g., rectangular blob(s)). As further described above in conjunction with FIG. 2, the example clusterer 212 may use a region growing algorithm to generate the blob(s) corresponding to object(s) of interest. At block 408, the example filter 216 determines if there are any blob(s) that is/are below a threshold size. Blob(s) that are below a threshold size may correspond to false positives (e.g., objects that are not of interest but identified as of interest) and/or may be too small to have a significant impact. As described above in conjunction with FIG. 2, the threshold may be based on characteristics of the frame (e.g., resolution, viewpoint, scale, field of view, amount of zoom, etc.). If the example filter 216 determines that there is not a blob that is below the threshold size (block 408: NO), control continues to block 412. If the example filter 216 determines that there is at least one blob that is below the threshold size, the example filter 216 discards the blob(s) that is/are below the threshold size (block 410).

At block 412, the example box comparator 218 determines an intersection over union value for the remaining blob(s) and the tracked object(s) (e.g., bounding box(es) identified by the neural network 110 in a subsequent frame). As described above, the intersection over union value is a ratio of (A) the intersection between all the remaining blob(s) of the frame with all the tracked object(s) (e.g., bounding box(es) from a previous AI-based object detection) and (B) the union of all the remaining blob(s) of the frame with all the tracked object(s). At block 414, the example threshold comparator 214 determines if the intersection over union value determined at block 412 is below a threshold value. If the intersection over union value is lower than a threshold, then the objects in the current frame significantly differ in position than the previous object detected frame and it is more likely that a new object has entered the frame.

If the example threshold comparator 214 determines that the intersection over union value is below the threshold (block 414: YES), the box comparator 218 determines that the frame has a new object in it (block 416) and control returns to block 316 of FIG. 3. If the example threshold comparator 214 determines that the intersection over union value is not below the threshold (block 414: NO), the box comparator 218 determines that the frame does not have a new object in it (block 418) and control returns to block 316 of FIG. 3.

Figure 5:
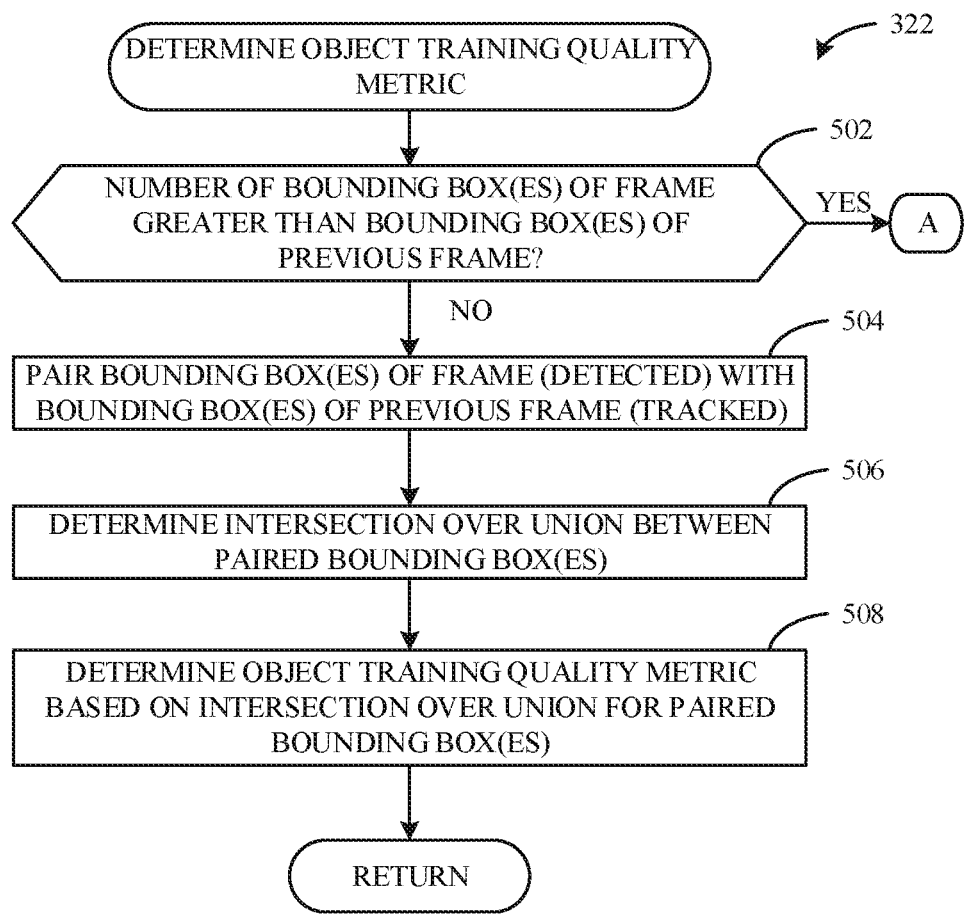

FIG. 5 is an example flowchart representative of machine readable instructions 322 that may be executed to implement the example dynamic object tracker 108 of FIG. 2 to determine the object training quality metric for object tracking between AI-based object detection periods, as described above in conjunction with block 322 of FIG. 3.

At block 502, the example box comparator 218 determines if the number of bounding box(es) of the current frame is greater than the number of bounding box(es) for the previous frame that was processed with the example neural network 110. As described above, the neural network 110 processes selected frames to generate bounding boxes corresponding to objects of interest (e.g., foreground objects). If the box comparator 218 determines that the number of bounding box(es) of the current frame is greater than the number of bounding box(es) of the previous frame, then there is a new object in the current frame that was not identified during the object tracking process of block and/or instruction 314 of FIGS. 3 and/or 4, thereby corresponding to poor object tracking performance. However, if the box comparator 218 determines that the number of bounding box(es) of the current frame is less than or equal to the number of bounding box(es) of the previous frame, then there is not a new object in the frame that was not identified during the object tracking process of block and/or instruction 314 of FIGS. 3 and/or 4, thereby corresponding to good object tracking performance.

If the example box comparator 218 determines that the number of bounding box(es) of the current frame is greater than the bounding box(es) of the previous frame that was processed with the neural network 110 (block 502: YES), control returns to block 328 of FIG. 3 to reset the object detection period to a base period, thereby decreasing the number of frames that are tracked before object detection occurs with the neural network 110 to increase tracking performance.

If the example box comparator 218 determines that the number of bounding box(es) of the current frame is not greater than the bounding box(es) of the previous frame that was processed with the neural network 110 (block 502: NO), the example box comparator 218 pairs the bounding box(es) of the current frame (e.g., the detected bounding boxes from the neural network 110) with the bounding box(es) of a previous frame (e.g., the tracked bounding boxes from a previous frame that were detected from the neural network 110) (block 504). As described above in conjunction with FIG. 2, the example box comparator 218 may pair the bounding box(es) between the two frames based on a nearest neighbor measure by representing each bounding box by a vector of pixel coordinates.

At block 506, the example box comparator 218 determines an intersection over union value between the paired bounding box(es). For example, the box comparator 218 determines a first intersection over union value between a first pair of bounding boxes, a second intersection over union value between a second pair of bounding boxes, etc., thereby resulting in N intersection over union values corresponding to the N pairs. At block 508, the example averager 220 and/or the box comparator 218 determines the object training quality metric(s) based on the average intersection over union value for the paired bounding box(es). For example, if the intersection over union value is an average and the example box comparator 218 paired three sets of bounding boxes from a previous frame and the current frame and determined that the intersection over union value for respective pairs are 0.9, 0.85, and 0.7, the averager 200 determines the object tracking quality metric (e.g., the average intersection over union value) to be 0.82 ((0.9+0.85+0.7)/3). The object training quality metric corresponds to the tracking performance. Accordingly, a high object training quality metric corresponds to high tracking performance and a low object training quality metric corresponds to low tracking performance. If the object training quality metrics are the intersection over unions (e.g., not an average of the intersection over unions), the box comparator 218 determines the object training quality metrics to be the intersection over unions (e.g., 0.9, 0.85, 0.7). The example dynamic object tracker 108 can adjust the object detection period to increase performance (e.g., by resetting or decrementing the object detection period) or decrease resource consumption (e.g., by incrementing the object detection period) based on the result of the object training quality metric, as described above in conjunction with blocks 324, 326, 328 FIG. 3.

Figure 6:
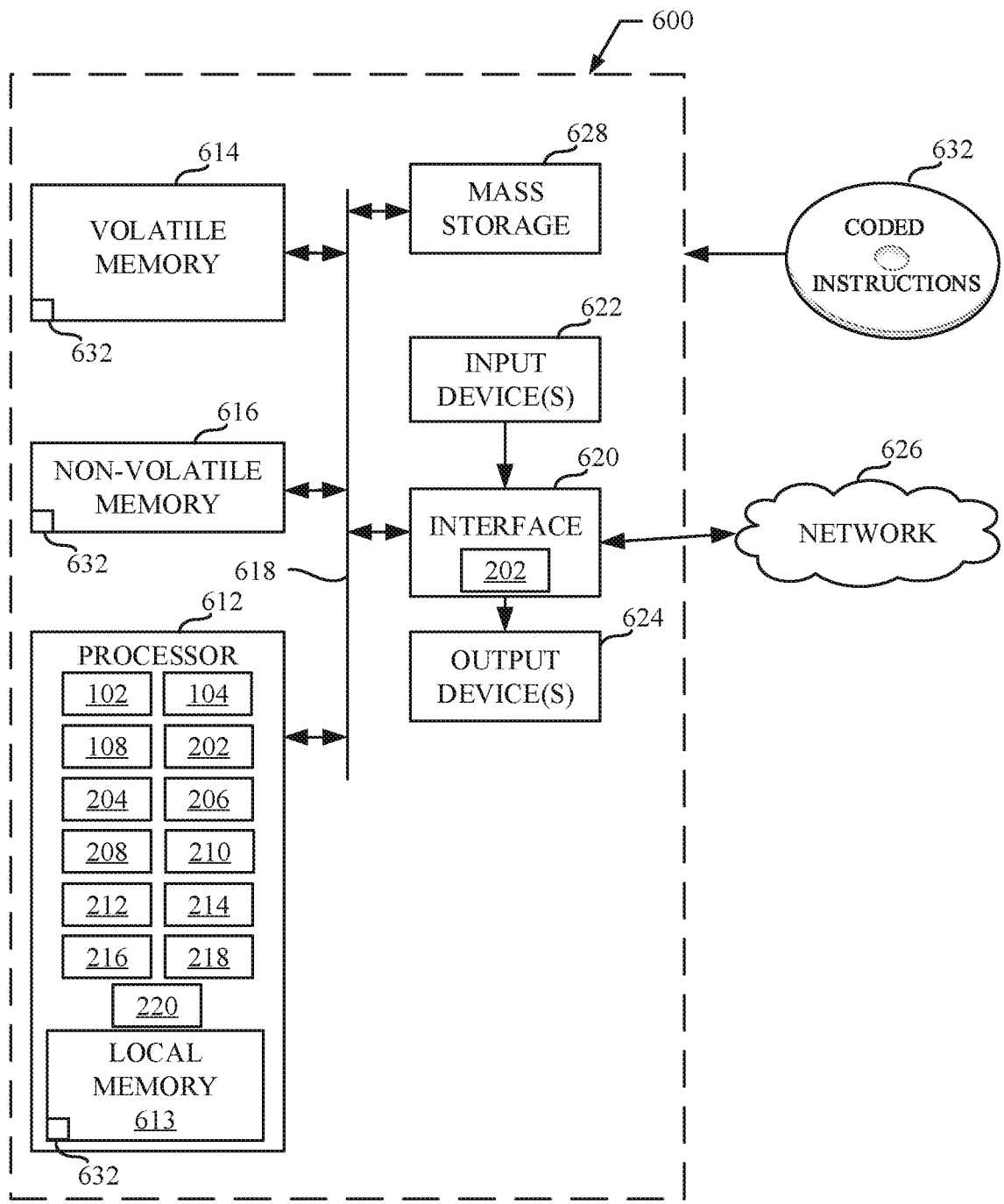
FIG. 6 is a block diagram of an example processing platform structured to execute the instructions of FIGS. 3-5 to implement the example dynamic object tracker of FIGS. 1 and/or 2.

FIG. 6 is a block diagram of an example processor platform 600 structured to execute the instructions of FIGS. 3-5 to implement the video processing system 100 and/or the dynamic object tracker 108 of FIG. 2. The processor platform 600 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device.

In this example, the processor implements the example video decoder 104, the example video frame queue 106, the example neural network 110, the example interface 202, the example counter 204, the example count comparator 206, the example bitstream analyzer 208, the example subtractor 210, the example clusterer 212, the example threshold comparator 214, the example filter 216, the example box comparator 218, and the example averager 220.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface. In this example, the interface circuit 630 implemented the example interface 202 of FIG. 2.

In the illustrated example, one or more input devices 622 are connected to the interface circuit 620. The input device (s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that improve efficiency of object tracking in video frames. Example methods, apparatus and articles of manufacture improve object tracking efficiency by increasing the frequency of AI-based object detection when tracking performance is low (below a desired threshold) and decreasing the frequency of AI-based object detection when tracking performance is high (e.g., above the desired threshold). In this manner, processing speed is increased and computing resources are conserved when tracking performance is high and tracking performance is increased when tracking performance is low. Additionally, examples disclosed herein increase efficiency of object tracking by initiating AI-based object detection as an interrupt when a new object has appeared in a frame between object detection frames, thereby increasing tracking performance. Accordingly, example methods, apparatus and articles of manufacture disclosed herein are directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   clusterer instructions to cluster pixels of a foreground map of a first video frame into blobs;
   a comparator to determine an intersection over union value between the blobs and bounding boxes in a second video frame;
   a counter to increment a frame count when the first video frame is obtained;
   a count comparator to compare the frame count to an object detection count; and
   an interface to output the first video frame to a neural network to initiate object detection by the neural network on the first video frame when (a) the intersection over union value does not satisfy a threshold and (b) the frame count is greater than or equal to the object detection count, the neural network to generate one or more bounding boxes based on the first video frame, the counter to be reset when the frame count is greater than or equal to the object detection count.

2. The apparatus of claim 1, wherein the intersection over union value does not satisfy the threshold when a new object is present in the first video frame and is not present in the second video frame.

3. The apparatus of claim 1, further including:
   bitstream analyzer instructions to determine a global motion vector of the first video frame; and
   a subtractor to generate the foreground map by subtracting the global motion vector from the first video frame.

4. The apparatus of claim 3, wherein the bitstream analyzer instructions are to determine the global motion vector from a bitstream of at least one of the first video frame or a video stream including the first video frame.

5. The apparatus of claim 3, wherein the global motion vector corresponds to movement of a camera.

6. The apparatus of claim 1, further including a filter to remove a subset of the blobs that are below a threshold size.

7. The apparatus of claim 1, wherein the clusterer instructions are to cluster a subsequent map of a third video frame into subsequent blobs when the intersection over union value satisfies the threshold, the third video frame subsequent to the first video frame.

8. The apparatus of claim 7, wherein the clusterer instructions are to cluster the subsequent map of the third video frame into the subsequent blobs without the object detection being performed on the first video frame.

9. The apparatus of claim 1, wherein:
the comparator is to compare a first number of the one or more bounding boxes based on the first video frame to a second number of the bounding boxes of the second video frame that have been processed by the neural network; and
the counter is to decrease the object detection count when the first number is greater than the second number.

10. The apparatus of claim 1, wherein the comparator is to (A) pair the one or more bounding boxes of the first video frame with the bounding boxes of the second video frame and (B) determine one or more intersection over union values between the pairs, and further including:
averager instructions to average the one or more intersection over union values, the counter to adjust the object detection count based on the average.

11. The apparatus of claim 10, wherein the threshold is a first threshold, the counter to increase the object detection count when the average is greater than a second threshold and decrease the object detection count when the average is less than the threshold.

12. The apparatus of claim 11, wherein the counter is to decrease the object detection count to a base number when the average is less than the threshold.

13. The apparatus of claim 1, wherein the comparator is to (A) pair the one or more bounding boxes of the first video frame with the bounding boxes of the second video frame and (B) determine one or more intersection over union values between the pairs, the counter to adjust the object detection count based on the one or more intersection over union values between the pairs.

14. A non-transitory computer readable storage medium comprising instructions which, when executed, cause a machine to at least:
group pixels of a map of a first video frame into blobs;
determine an intersection over union value between the blobs and bounding boxes in a second video frame;
increment a frame count when the first video frame is obtained;
compare the frame count to an object detection count; and
provide the first video frame to a neural network for object detection when (a) the intersection over union value does not satisfy a threshold and (b) the frame count is greater than or equal to the object detection count, the neural network to generate one or more bounding boxes based on the first video frame, the frame count to be reset when the frame count is greater than or equal to the object detection count.

15. The non-transitory computer readable storage medium of claim 14, wherein the instructions cause the machine to:
compare a first number of the one or more bounding boxes based on the first video frame to a second number of the bounding boxes of the second video frame that have been processed by the neural network; and
decrease the object detection count when the first number is greater than the second number.

16. The non-transitory computer readable storage medium of claim 14, wherein the instructions cause the machine to:
pair the one or more bounding boxes of the first video frame with the bounding boxes of the second video frame;
determine one or more intersection over union values between the pairs; and
average the one or more intersection over union values, the adjusting of the object detection count being based on the average.

17. The non-transitory computer readable storage medium of claim 16, wherein the threshold is a first threshold, wherein the instructions cause the machine to increase the object detection count when the average a second threshold and decrease the object detection count when the average is less than the threshold.

18. The non-transitory computer readable storage medium of claim 14, wherein the intersection over union value does not satisfy the threshold when a new object is present in the first video frame and is not present in the second video frame.

19. A method comprising:
generating, by executing an instruction with a processor, blobs from a map of a first video frame;
calculating, by executing an instruction with the processor, an intersection over union value between the blobs and bounding boxes in a second video frame
incrementing, by executing an instruction with the processor, a frame count when the first video frame is obtained;
comparing, by executing an instruction with the processor, the frame count to an object detection count; and
instructing a neural network to perform object detection on the first video frame when (a) the intersection over union value does not satisfy a threshold and (b) the frame count is greater than or equal to the object detection count, the neural network to generate one or more bounding boxes based on the first video frame, the frame count to be reset when the frame count is greater than or equal to the object detection count.

20. The method of claim 19, further including:
comparing a first number of the one or more bounding boxes based on the first video frame to a second number of the bounding boxes of the second video frame that have been processed by the neural network; and
decreasing the object detection count when the first number is greater than the second number.

21. An apparatus comprising:
memory;
instructions in the apparatus; and
processor circuitry to execute the instruction to:
create blobs using pixels of a map of a first video frame;
determine an intersection over union value between the blobs and bounding boxes in a second video frame;
increment a frame count when the first video frame is obtained;
compare the frame count to an object detection count; and
provide the first video frame to a neural network for object detection in response to (a) the intersection over union value not satisfying a threshold and (b) the frame count is greater than or equal to the object detection count, the neural network to generate one or more bounding boxes based on the first video frame, the frame count to be reset when the frame count is greater than or equal to the object detection count.

22. The apparatus of claim 21, wherein the processor circuitry is to:
compare a first number of the one or more bounding boxes based on the first video frame to a second number of the bounding boxes of the second video frame that have been processed by the neural network; and
decrease the object detection count when the first number is greater than the second number.

23. The apparatus of claim 21, wherein the processor circuitry is to:
pair the one or more bounding boxes of the first video frame with the bounding boxes of the second video frame;
determine one or more intersection over union values between the pairs; and
average the one or more intersection over union values, the adjusting of the object detection count being based on the average.

24. The apparatus of claim 23, wherein the threshold is a first threshold, wherein the processor circuitry to increase the object detection count when the average a second threshold and decrease the object detection count when the average is less than the threshold.

25. The apparatus of claim 21, wherein the processor circuitry is to:
pair the one or more bounding boxes of the first video frame with the bounding boxes of the second video frame;
determine one or more intersection over union values between the pairs;
average the one or more intersection over union values; and
adjust the object detection count based on the average.

* * * * *